(12) United States Patent
Williams et al.

(10) Patent No.: US 7,049,551 B2
(45) Date of Patent: May 23, 2006

(54) NATURAL CONVECTION STEAM COOKING DEVICE

(75) Inventors: Rafe T. Williams, Raleigh, NC (US); Joseph J. Saunders, Fuquay-Varina, NC (US); Phillip D. Knott, Willow Spring, NC (US); Robert Van Murray, Fuquay-Varina, NC (US)

(73) Assignee: Middleby Marshall, Inc., Elgin, IL (US)

( * ) Notice: Subject to any disclaimer, the term of this patent is extended or adjusted under 35 U.S.C. 154(b) by 100 days.

(21) Appl. No.: 10/955,035

(22) Filed: Sep. 30, 2004

(65) Prior Publication Data

US 2006/0081592 A1    Apr. 20, 2006

(51) Int. Cl.
*A21B 1/24* (2006.01)
*A21B 1/36* (2006.01)

(52) U.S. Cl. .......................................... 219/401; 126/20
(58) Field of Classification Search ................. 219/401
See application file for complete search history.

(56) References Cited

U.S. PATENT DOCUMENTS

| | | |
|---|---|---|
| 2,214,425 A | 9/1940 | McNamara |
| 2,472,451 A | 6/1949 | Whitney |
| 2,536,369 A | 1/1951 | Hubbard |
| 2,712,295 A | 7/1955 | Haynes |
| 3,604,895 A * | 9/1971 | MacKay ..................... 219/401 |
| 3,769,902 A | 11/1973 | Hurwitz |
| 3,873,806 A | 3/1975 | Schossow |
| 3,991,737 A | 11/1976 | Del Fabbro |
| 4,083,250 A | 4/1978 | Goff |
| 4,426,923 A | 1/1984 | Ohata |
| 4,460,822 A * | 7/1984 | Alden et al. ................. 219/401 |
| 4,506,598 A | 3/1985 | Meister |
| 4,509,412 A | 4/1985 | Whittenburg et al. |
| 4,548,156 A | 10/1985 | Shibata |
| 4,585,661 A | 4/1986 | Brummett |
| 4,622,231 A | 11/1986 | Swartley |
| 4,641,630 A | 2/1987 | Meister |
| 4,655,192 A | 4/1987 | Jovanovic |
| 4,722,321 A | 2/1988 | Meister |
| 4,817,582 A | 4/1989 | Oslin et al. |
| 4,920,251 A | 4/1990 | Whitenack et al. |
| 4,924,072 A | 5/1990 | Oslin |
| 4,982,655 A | 1/1991 | Wen-Der |
| 5,014,679 A | 5/1991 | Childs et al. |
| 5,048,400 A | 9/1991 | Ueda |
| 5,103,076 A * | 4/1992 | Houkuwa .................... 219/401 |
| 5,447,145 A | 9/1995 | Cappello et al. |
| 5,549,038 A | 8/1996 | Kolvites |

(Continued)

*Primary Examiner*—Joseph Pelham
(74) *Attorney, Agent, or Firm*—Coats&Bennett,P.L.L.C.

(57) ABSTRACT

A natural convection steam cooking device with a cooking cavity having a floor defining a lower boundary thereof and a sidewall defining a side boundary thereof, the floor having a plurality of first holes therein, the sidewall having a plurality of second holes therein; a steam chamber disposed below the cooking cavity and along the sidewall, the steam chamber having a pool disposed below the floor; wherein the steam enters the cooking cavity from the steam chamber via both the first holes and the second holes; and wherein the steam circulates within the device in an unforced manner by natural convection. The first holes and the second holes may have a ratio of cross-sectional areas of approximately 2:3. And method(s) of providing steam to, and design of steam flow for, a cooking cavity of a commercial steam cooking device.

41 Claims, 7 Drawing Sheets

U.S. PATENT DOCUMENTS

| | | |
|---|---|---|
| 5,619,983 A | 4/1997 | Smith |
| 5,631,033 A | 5/1997 | Kolvites |
| 5,636,622 A | 6/1997 | Urcelay Amondarain et al. |
| 5,640,946 A | 6/1997 | Oslin |
| 5,653,164 A | 8/1997 | Vallee |
| 5,666,910 A | 9/1997 | George, II et al. |
| 5,722,289 A | 3/1998 | Carr |
| 5,865,108 A | 2/1999 | Montagnino et al. |
| 5,869,812 A | 2/1999 | Creamer et al. |
| 5,960,785 A | 10/1999 | Byrne et al. |
| 5,968,388 A | 10/1999 | Creamer |
| 5,988,154 A | 11/1999 | Douglas et al. |
| 6,098,527 A | 8/2000 | Chang |
| 6,107,605 A | 8/2000 | Creamer et al. |
| 6,143,341 A | 11/2000 | Sikes |
| 6,157,006 A | 12/2000 | Sickles et al. |
| 6,175,100 B1 | 1/2001 | Creamer et al. |
| 6,323,464 B1 | 11/2001 | Cohn |
| 6,453,802 B1 | 9/2002 | Manganiello et al. |
| 6,510,280 B1 | 1/2003 | Chen |
| 2003/0034208 A1 | 2/2003 | Winfree et al. |
| 2003/0188929 A2 | 10/2003 | Winfree et al. |

* cited by examiner

US 7,049,551 B2

NATURAL CONVECTION STEAM COOKING DEVICE

BACKGROUND OF THE INVENTION

The present invention relates generally to the field of commercial steam cooking devices.

Modern steam ovens operate by heating water to generate steam and then supplying the steam to a cooking cavity containing food. Some of these steam ovens operate at low pressures, slightly above atmospheric, while others are openly vented to atmosphere. For either arrangement, one concern to designers is ensuring the proper distribution of steam within the cooking cavity for optimum cooking. Some available steam ovens use forced recirculation of steam in the cooking cavity, such as by using a recirculation fan connected to the cooking cavity, in order to make the cooking more efficient. However, the efficient distribution of steam without the use of forced circulation has been elusive. Further, most commercially available steam ovens require a substantial amount of time, on the order of 15–20 minutes, in order to start generating steam once the steam oven is turned on. Obviously, shortening this delay between turning on the steam oven and steam generation would lead to better energy efficiency and increased user satisfaction. However, efforts directed to shortening the delay have not yet resulted in significant success. Finally, the control systems for steam ovens can sometimes be overly complicated, leading to increased costs.

SUMMARY OF THE INVENTION

In one embodiment, the present invention provides a method of providing steam to a cooking cavity of a commercial steam cooking device, the cooking cavity having a floor defining a lower boundary thereof and a sidewall defining a side boundary thereof, the method comprising: generating steam by heating water in a pool disposed below the cooking cavity, the pool forming a portion of a steam chamber; routing steam from the steam chamber to the cooking cavity via both a plurality of first holes in the floor and a plurality of second holes in the sidewall; and circulating the steam within the device in an unforced manner by natural convection. The steam chamber may include a first generally horizontal section disposed between the pool and the floor and a second generally vertical section disposed proximate the sidewall, and the routing steam to the cooking cavity may comprise routing steam along the second section and out the second holes. The second section may be bounded by the sidewall. The pool may extend directly beneath the first and second compartments and the generating steam may comprise heating water in the pool and thereby supplying steam directly to the first and second sections of the steam chamber. The routing steam to the cooking cavity may comprise routing approximately 1½ times as much steam to the cooking cavity via the second holes as compared to via the first holes. The second holes may be are disposed entirely in a lower ⅔ of the sidewall. The method may further comprise limiting pressures in the cooking chamber to not more than slightly above atmosphere by connecting the cooking cavity to atmosphere via exhaust duct and a cap that moveably engages the exhaust duct. The circulating of steam within the device in an unforced manner by natural convection may comprise circulating the steam within the cooking device in an unforced manner by natural convection along two paths: a first path from the steam chamber out through the first holes to the cooking cavity and then back to the steam chamber; and a second path from the pool, generally vertically proximate the sidewall, then out through the second holes into the cooking cavity, and then back to the steam chamber.

The method above may further comprise: a) in response to turning on the cooking device, initiating a water flow into the pool and substantially simultaneously activating a heat source to generate heat; and b) thereafter, controlling the on/off state of the heat source based on a thermal sensor in thermal communication with the pool while circulating steam within the device by unforced natural convection. Further additions to the method may comprise c) thereafter draining the pool in response to turning off the cooking device; and d) thereafter repeating steps a and b. The method may also further comprise feeding water to the pool at a uniform rate during step b. The controlling the heat source may comprise turning the heat source off in response to the thermal sensor sensing a temperature of at least a predetermined temperature and thereafter automatically turning the heat source back on in response to the thermal sensor sensing a temperature below the predetermined temperature. The pool may have a pool floor disposed at an angle relative to horizontal, and the initiating a water flow into the pool may comprise initiating a water flow into the pool via an inlet disposed proximate a lower side of the pool floor. The steam cooking device may further comprise a steam trap assembly disposed adjacent the cooking cavity and having downwardly extending baffle; and the method may further comprise, after step a, feeding water from the pool to the steam trap assembly.

In another embodiment, the present invention provides a natural convection steam cooking device comprising: a cooking cavity having a floor defining a lower boundary thereof and a sidewall defining a side boundary thereof, the floor having a plurality of first holes therein, the sidewall having a plurality of second holes therein; a steam chamber disposed below the cooking cavity and along the sidewall, the steam chamber operatively connecting to the cooking cavity via the first and second holes for the passage of steam from the steam chamber into the cooking cavity, the steam chamber having a pool disposed below the floor; a heat source for heating water in the pool so as to generate steam in the steam chamber; wherein the steam enters the cooking cavity from the steam chamber via both the first holes and the second holes; and wherein the steam circulates within the device in an unforced manner by natural convection. The steam may circulate within the cooking device in an unforced manner by natural convection along two paths: a first path from the steam chamber out through the first holes to the cooking cavity and then back to the steam chamber; and a second path from the pool, generally vertically proximate the sidewall, then out through the second holes into the cooking cavity, and then back to the steam chamber. The steam chamber may include a first generally horizontal section disposed between the pool and the floor and a second generally vertical section disposed proximate the sidewall. The floor may generally define a boundary of the first section of the steam chamber and/or the second section may be bounded by the sidewall. The pool may extend directly beneath the first and second compartments. The first holes and the second holes may have a ratio of cross-sectional areas of approximately 2:3 and/or second holes may be disposed in a lower ⅔ of the sidewall. The device may further comprise an exhaust connecting the cooking cavity to atmosphere, the exhaust comprising an exhaust duct and a cap moveably engaging the exhaust duct, wherein the cap is operative to limit pressures in the cooking chamber to not more than slightly above atmosphere. The heat source may comprise one or more electrical heating elements, which may be controlled via an automatically resetting thermal sensor connected to control the heat source such that heat source is turned off in response to the thermal sensor sensing a temperature of at least a predetermined temperature, but is turned on in response to the thermal sensor sensing a temperature below the predetermined temperature. The bottom of the pool may disposed at an angle to horizontal, and a water inlet for the pool may be disposed on a lower side of the bottom. The sidewall may be removable without the use of tools. The cooking cavity may advantageously have a shape of a parallelepiped. At least two of the walls defining the cooking cavity, not including a door, may be immovably fixed to the device and/or be non-porous. Most embodiments will have a cooking cavity that has a volume of about two cubic feet or more and is adapted to support a plurality of trays for holding food to be cooked.

In yet another embodiment, the present invention provides a method of designing steam flow in a natural convection steam cooking device having a cooking cavity, the cooking cavity having a floor defining a lower boundary thereof and a sidewall defining a side boundary thereof, the method comprising: establishing a plurality of first holes in the floor and a plurality of second holes in the sidewall; the first and second holes operatively connecting the cooking cavity to a steam chamber located below the floor and proximate the sidewall; running first and second tests with a first size and/or location of the second holes to generate first and second respective test results, the tests comprising: a) routing steam from the steam chamber to the cooking cavity via both the first holes and the second holes and circulating the steam within the device in an unforced manner by natural convection; and b) monitoring heat transfer in the cooking cavity during the routing; selecting the size and/or location of the second holes corresponding to the test whose test results indicate more uniform heat transfer. The method may further comprise placing a plurality of trays in the cooking cavity, and the monitoring may comprise monitoring the temperature of a mass placed in each of the trays during the routing. The selecting may comprise selecting the size and/or location of the second holes corresponding to the test whose test results indicate a minimum time difference between a first of the masses reaching a temperature and the last of the masses reaching the temperature. The plurality of trays may comprise at least five trays.

DETAILED DESCRIPTION OF THE INVENTION

Figure 1:
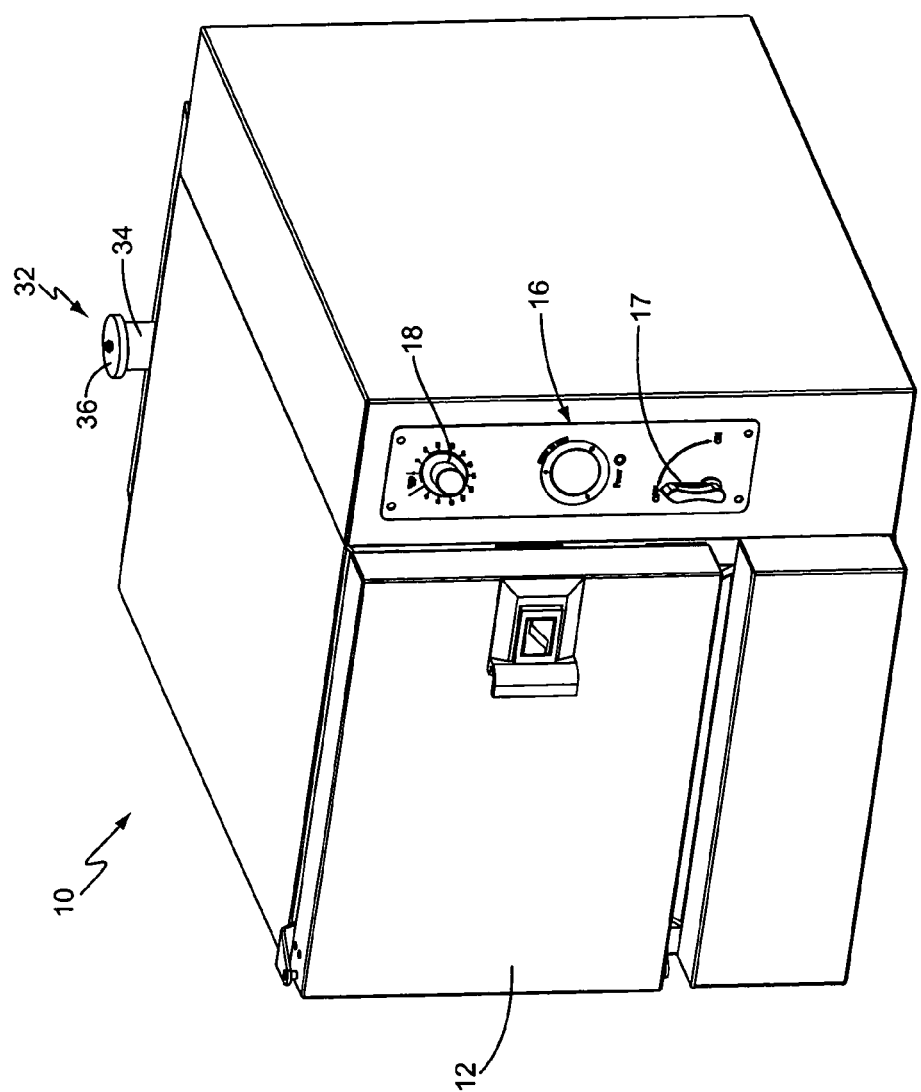
FIG. 1 is a perspective view of one embodiment of a steamer according to the present invention.

One embodiment of a cooking device according to the present invention, sometimes referred to herein as a steamer, is generally indicated at 10. From outward appearance, the steamer 10 may appear similar to steamers currently available on the market. Indeed, as is typical for such devices, the steamer 10 includes a latched door 12 for providing access to the cooking cavity 30 and controls 16 to control the operation of the steamer 10. The controls 16 may take any form known in the art, and typically include an on/off switch 17, indicator lights, a timer 18, and other suitable electronics, such as a door-open sensor 14 for sensing when the door 12 is open. The electronics of the controls 16 may be generally segregated from cooking cavity 30 and may be advantageously vented to the ambient atmosphere for cooling.

The cooking cavity 30 typically takes the form of a substantially parallelepiped chamber, preferably substantially rectangular chamber, with racks (not shown) for supporting food trays 5 as is known in the art. The cooking cavity 30 is bounded by suitable sidewalls 42,44,48, a floor 50, a ceiling 46, and the inside of the door 12. The sidewalls 42,44 and the ceiling 46 are advantageously immovably fixed to the device 10 and non-porous. In most embodiments, the cooking cavity 30 that has a volume of about two cubic feet or more. In the present invention, the cooking cavity 30 may be vented to the atmosphere via an exhaust system 32 that typically includes an exhaust duct 34 and associated cap 36. The cap 36 acts as a slight damper on the venting of gases from the cooking cavity 30. However, once the pressure in the cooking cavity 30 reaches a sufficient level to overcome the weight of the cap 36, the cap 36 is displaced in a "burping" action that vents some gases from the cooking cavity 30, thereby preventing significant build-up of pressure therein. In preferred embodiments, the cap 36 is designed to prevent the build-up of pressures more than slightly above atmospheric in the cooking cavity 30, such as of not more than about five inches of water column. As such, no special pressure vessel structure or certification should be required for the steamer 10.

In the illustrative embodiment, the ceiling 46, rear sidewall 44, and left sidewall 42 are solid, while the floor 50 and the right sidewall 48 have a plurality of holes 52,54 therein. In particular, the floor 50 has a plurality of holes, referred to herein as the primary holes 52, that connect to the steam chamber 60 as discussed below. The primary holes 52 may advantageously be arranged in two arrays of similarly sized holes. For example, there may be sixteen rows of six holes 52 each in a middle portion of the floor 50, with the holes 52 having a ½ inch diameter, and eight slots 52 of ½ inch by two inches arranged around the peripherally of the floor 50. Of course, other hole arrangements may be used in other embodiments. The floor 50 may advantageously be readily removable from the cooking device 10 to allow access by a user from the cooking cavity 30 to at least a portion of the steam chamber 60 for cleaning. If so, it may be advantageous to enlarge one hole 52 on each end to a larger size, such as one inch, to provide a clear finger hole to aid in removing the floor 50. The right sidewall 48 likewise includes a plurality of holes, referred to herein as secondary holes 54, that connect the cooking cavity 30 to the steam chamber 60 as discussed further below. These secondary holes 54 may advantageously take the form of an array of slots, such at the ¼ inch wide slots shown in FIG. 5, but this is not required by all embodiments.

Figure 2:
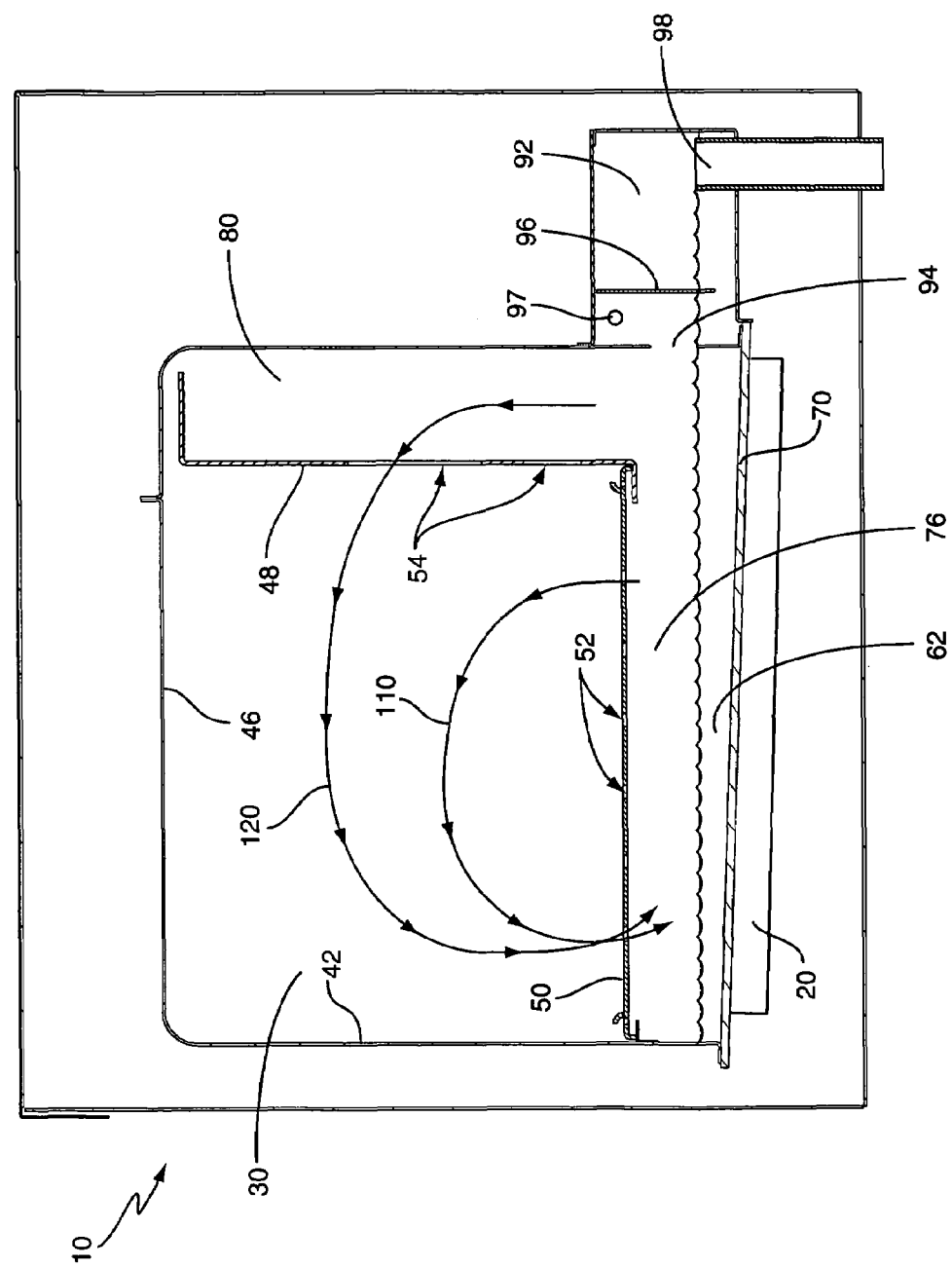
FIG. 2 is a sectional view of the cooking device of FIG. 1 illustrating the steam flow paths.
Figure 3:
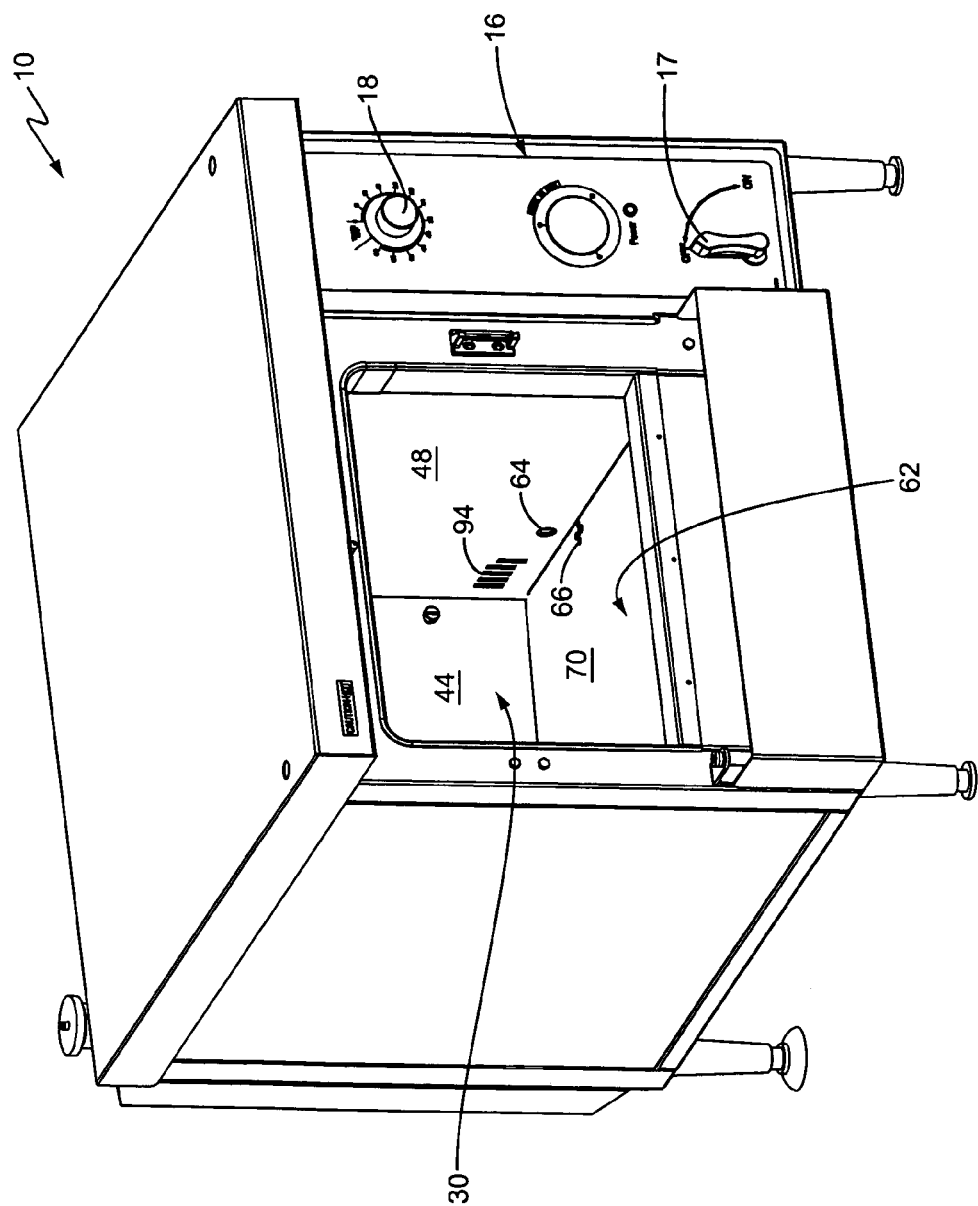
FIG. 3 is a view of the floor of the pool.

The steamer 10 includes a steam chamber 60 located below and along at least one side of the cooking cavity 30 (see FIG. 2). The steam chamber 60 includes a pool area 62, a first steam compartment 76, and a second steam compartment 80. The pool area 62 (or "pool") is disposed in a lower portion of steam chamber 60, beneath the first steam compartment 76 and the lower portion of second steam compartment 80. The pool 62 holds the liquid (typically "tap" water) that is heated to generate steam. The pool 62 is filled via a water inlet port 64 on the right side and drained via a pool drain 66 located on the right side that connects to the main drain line 99 for the steamer via a drain valve 68. The floor of the pool 62 is advantageously slightly angled to the right so that the water is directed to the pool drain 66 and is shallower on the left than on the right.

One or more electric heating elements 20 are provided to supply sufficient heat to the pool 62 so as generate steam. These electrical resistance heaters 20 are advantageously positioned directly below the pool 62 and may come in a variety of shapes and sizes. In an advantageous embodiment, each heating element 20 is a rectangular shaped block of aluminum with an embedded electrical resistance core and a thermal fuse 24. A plurality of these heating elements 20 are attached to the underside of the pool 62 of the steam chamber 60. Optionally, a compressible heat transfer layer (not shown) may be used, as disclosed in U.S. Pat. No. 5,968,388, which is incorporated herein by reference. An automatically resetting thermal sensor 22 is advantageously associated with the heating elements 20, such as being mounted to the side of one of the heating elements 20. While not strictly required for all embodiments, the thermal sensor 22 is advantageously disposed in a location that is external to all moisture (steam/water) contact areas of the cooking device 10. It should be noted that other heating element arrangements are encompassed by the present invention, including but not limited to common electrical resistance heaters, film resistance heaters, induction heaters, and gas heaters. It should be noted, that while not preferred, the heating elements 20 may alternatively be located in the pool 62, rather than underneath the pool 62 if desired. The operation of the heating element(s) 20 may be controlled as discussed further below.

The first steam compartment 76 is disposed between the pool 62 and the floor 50. Steam generated by the heated water in the pool 62 naturally rises into the first steam compartment 76. It is intended that there will be unforced flow through the first steam compartment 76, as described further below. The first steam compartment 76, and thus the steam chamber 60, is separated from the cooking cavity 30 by the floor 50 of the cooking cavity 30, meaning the cooking cavity's floor 50 may also form the "ceiling" of the first steam compartment 76 in some embodiments.

Second steam compartment 80 is disposed generally vertically along a selected side of the cooking cavity 30. The lower portion of second steam compartment 80 is defined by the water in pool 62 (or the floor of pool 62 in the absence of water). Right sidewall 48 helps define the boundary between second steam compartment 80 and cooking cavity 30. The secondary holes 54 in sidewall 48 allow steam from second steam compartment 80 to enter cooking cavity 30 via natural convection. Thus, steam entering the second steam compartment 80 flows upward by natural convection through the second steam compartment 80 and out the secondary holes 54 into the cooking cavity 30. Exhaust port 94 is disposed in a rear portion of second steam chamber 80, on a wall opposite right sidewall 48. Exhaust port 94 connects to the exhaust control system 90 as discussed further below. The exhaust port 94 is located at a height above the inlet port 64, and acts as a water overflow port to prevent overfilling of the pool 62.

The exhaust control system 90 includes an exhaust chamber 92, a spray nozzle 95, and a drain port 98. The exhaust chamber 92 is operatively connected to the second steam compartment 80 of steam chamber 60 via the exhaust port 94. The exhaust chamber 92 includes a downwardly extending baffle 96 that divides the exhaust chamber 92 into front and rear portions. The rear portion includes the drain port 98, which advantageously takes the form of a vertically extending open pipe structure. The drain port 98 provides a fluid flow path to the main drain line 99 of the steamer 10. The upper end of the drain port 98 is higher than both the lowest part of exhaust port 94 and the lower end of the baffle 92. It is intended that water will fill the exhaust chamber 92 to a level that is above the lower end of the baffle 92, but at or below the upper end of the drain port 98, so that a steam trap is formed in the front portion of the exhaust chamber 92. The spray nozzle 95 is located above the drain port 98, and sprays water into the rear portion of the exhaust chamber 92. As the pressure rises in the cooking cavity 30 and steam chamber 60, this pressure is communicated to the exhaust chamber 92 via the exhaust port 94. The rise in pressure may cause steam to break the steam trap formed at the baffle 92, but the spray from the spray nozzle 95 will act to cool the steam down to acceptable levels for draining into a municipal wastewater system. It should be noted that the exhaust port 94 may advantageously take the form of a cluster of slots with a smaller size, such as ¼ inch width, that are staggered in height so that one or more of the slots are lower than the others. The size of the drain port 98, drain line 99, and all other possible constrictions downstream from the exhaust port 94 are advantageously larger, such as ¾ inch minimum, so as to reduce the opportunity for clogging. In addition, the top of the exhaust chamber 92 may advantageously be removable, so as to allow access to the exhaust chamber 92 for cleaning, but should be suitably sealed against the anticipated steam pressures. Finally, the exhaust chamber 92 may advantageously be oriented relatively sideways, so as to project laterally outward from the area of the cooking cavity, so that the exhaust chamber 92 may reside within the lateral space for the controls 14 without increasing the overall width of the unit 10.

Steam is generated in the steam chamber 60 and flows to the cooking cavity 30 and back along two different paths, denoted as the primary path 110 and the secondary path 120 for convenience. The primary path 110 is from the first steam compartment 76 of steam chamber 60, through the primary holes 52 in the floor 50 of the cooking cavity 30, into the cooking cavity 30, and then back to the steam chamber 60. The secondary path 120 is from the second steam compartment 80 of the steam chamber 60, out the secondary holes 54 in the right sidewall 48 into the cooking cavity 30, and then back to the steam chamber 60. The flow of steam along both paths 110,120 is via natural convection. That is, the flow along the paths 110,120 is not caused by any sort of fan or other means typically associated with forced flow. It should be understood that natural convection does not preclude slight pressure differentials along the path, but there is not any propulsion mechanism located along either flow path 110,120.

Figure 7:
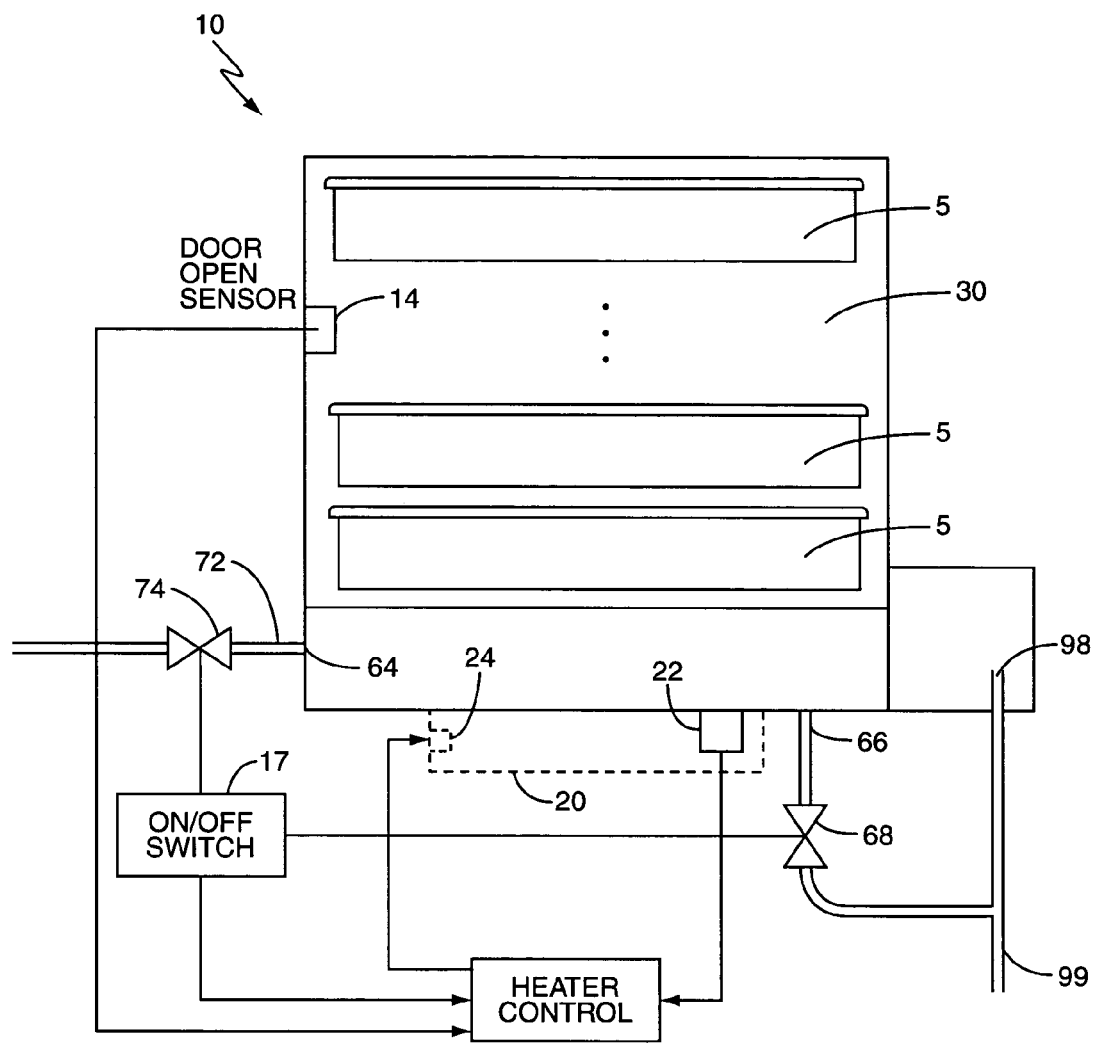
FIG. 7 is a simplified representation of the steamer of FIG. 1 showing control of water supply, water draining, and heater energization.

The control of water supply is simple in the steamer 10. First, the on/off switch 17 is advantageously mechanically linked to the pool drain valve 66, such as via a connecting rod, so that when on/off switch 17 is in the on position, the valve 66 is closed, but when the on/off switch 17 is turned to the off position, the valve 66 is opened. Further, both the on/off switch and the door-open sensor 14 are electrically linked to the water valve 74 so that the water valve 74 is open when the unit 10 is on and the door 12 is closed, otherwise, the water valve 74 is closed. See FIGS. 7–8. When open, the water valve 74 advantageously supplies water to the pool 62 and the sprayer 95 at a continuous uniform rate such as a constant 0.12 gallons per minute. As can be seen, no water level sensor per se, such as a float valve, is required. Indeed, no control sensors are exposed to the water and/or steam inside the unit 10.

Figure 8:
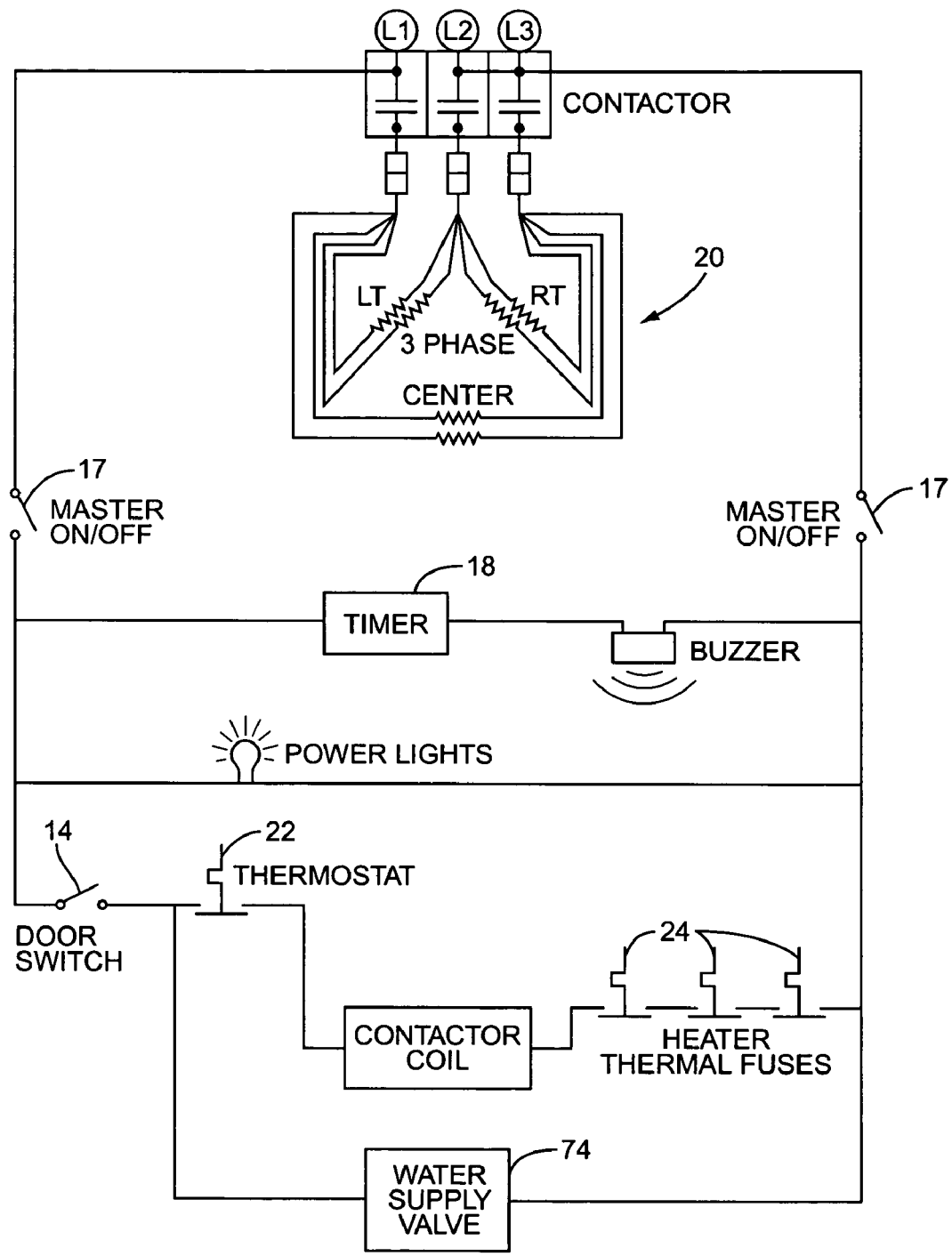
FIG. 8 is a simplified schematic of electronics suitable for use in the steamer of FIG. 1.

The control of the energization state (on or off) of the heating elements 20 is relatively simple in the steamer 10. With reference to FIG. 8, the heating elements 20 are energized in normal operation whenever the four following conditions are met: on/off switch 17 indicates that the steamer 10 is to be on, door-open sensor 14 indicates the door 12 is closed, thermal fuses 24 have not tripped, and thermal sensor 22 indicates a temperature of the floor 70 below a predetermined threshold. If any of the four conditions are not met, then the heating elements 20 are not energized.

In the prior art, steam generation from a cold start was fairly slow because a timer was engaged when the unit was turned on, and the timer was typically required to expire before the heating elements were energized. This timer controlled delay was for the purpose of allowing sufficient time to fill the pool to the desired level. In the preferred embodiments of the present invention, the initial steam generation from a cold start is much faster. In these embodiments, the heating elements 20 are energized immediately once the unit 10 is turned on (assuming the door 12 is shut) and water is simultaneously added to the pool 62. Thus, both the heating elements 20 and the water in the pool 62 begin heating immediately once the unit 10 is turned on, helping to generate steam faster. As a result, the built-in delay of the timer is avoided. It should be noted that the use of the automatically resetting thermal sensor 22 allows undesirable degradation of the heating elements 20 due to overheating to be avoided, both during "normal" operation and during initial start-up.

As discussed above, steam from the steam chamber 60 flows into the cooking cavity 30 via the primary holes 52 in the floor 50 and the secondary holes 54 in the right sidewall 48. It is believed that substantial improvement in performance is achieved by directing steam into the cooking cavity 30 not only at the bottom of the cooking cavity 30, but also directing steam into the cooking cavity 30 via at least one side of the cooking cavity 30. In this manner, a portion of the steam enters low in the cooking cavity 30, where it naturally rises to the top, while another portion of the steam is able to reach the middle of the cooking cavity 30 more directly. No known natural convection steamers were believed to provide such routing of the steam.

Figure 4:
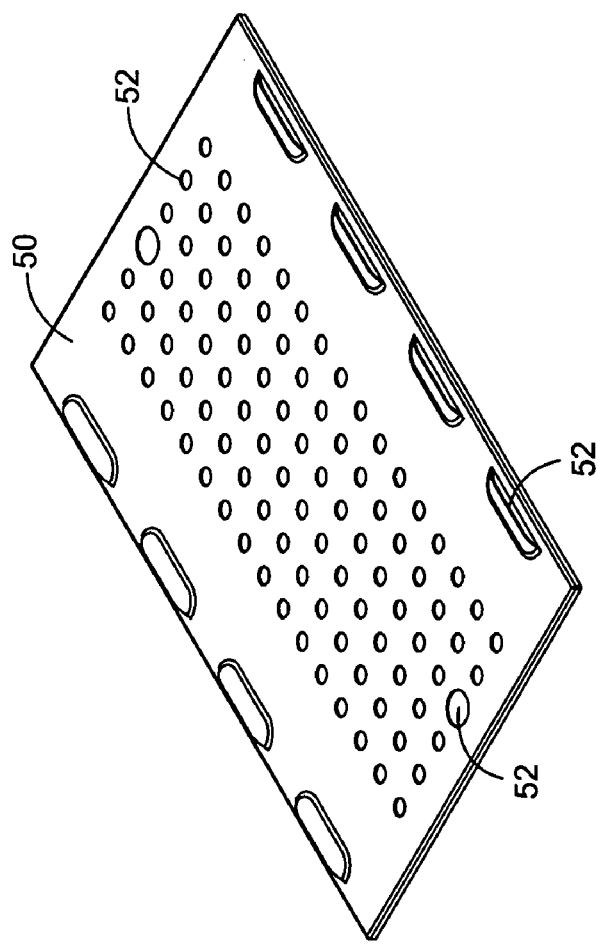
FIG. 4 is a view of the floor of the cooking cavity.
Figure 6:
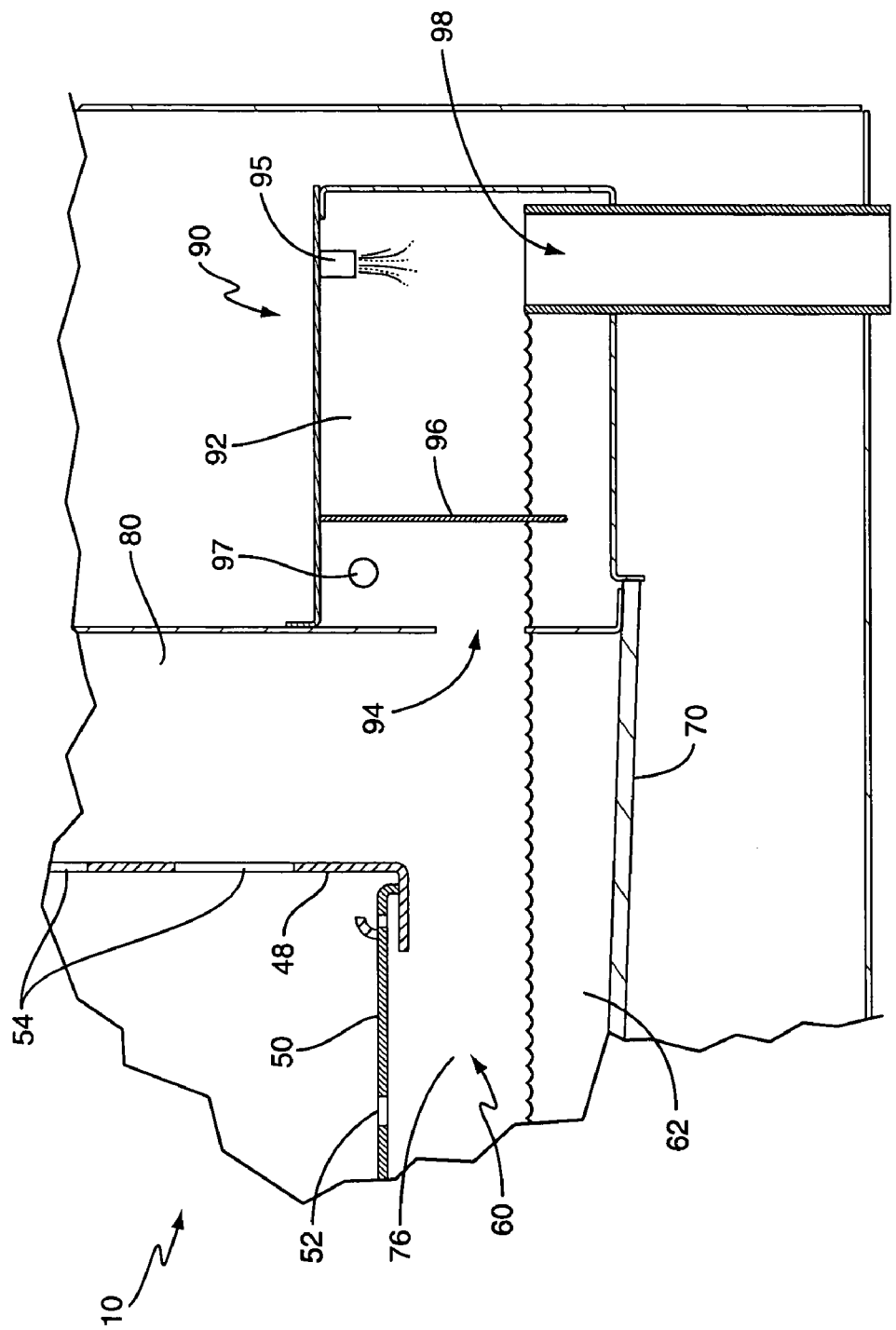
FIG. 6 is a partial side view showing the exhaust chamber.

However, the inventors also discovered that some tuning of the size and position of the relevant steam openings 52, 54 may also help improve the performance. To this end, experiments have been run, as described further below, that indicate routing the side-entry steam to the lower portion of the cooking cavity 30, but not all the way to the bottom, yields the best results. To run the experiment, five trays were loaded into the cooking cavity 30, each with a mass of a block of ice having a thermocouple embedded therein. The primary holes 52 in the floor were as shown in FIG. 4, with ninety-four ½ inch diameter holes 52, two 1.0 inch diameter holes 52, and six ½ inch by 2 inch obround holes 52 along the edge. The secondary holes 54 in the sidewall 48 were arranged in an array of three rows of slots, ¼ inch by 4 inches, with twenty-three slots 54 in each row. The elapsed time between the first tray to reach 180° and the last tray to reach 180° was then measured for various slot configurations. It is believed that users of the steamer 10 desire that there be as little variation in time between the trays as possible, meaning that the minimum elapsed is considered the best performance. The results of the experiments are presented below:

| | Top Row | | Middle Row | | Bottom Row | | |
|---|---|---|---|---|---|---|---|
| Test | upper | lower | upper | lower | upper | lower | Result |
| A | o | o | o | o | o | o | 12 min |
| B | x | o | o | x | o | o | 9¾ min |
| C | x | x | o | o | o | o | 4¼ min |
| D | x | x | o | o | x | x | 5 min |
| E | x | x | o | x | o | o | 5 min |
| F | x | x | x | o | o | o | 4 min |
| G | x | o | x | o | o | o | 7 min |
| H | x | x | o | o | o | x | 4 min | o = upper/lower half of slot open
x = upper/lower half of slot closed

Figure 5:
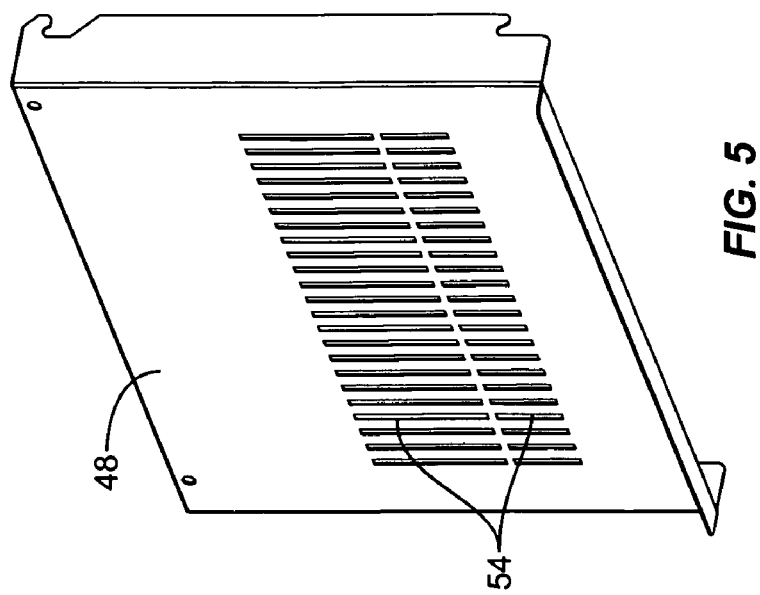
FIG. 5 is a view of the right sidewall of the cooking cavity.

As can be seen, the best results were achieved when the top row of slots 54 were closed off completely, the middle row were completely open, and the bottom row of slots 54 were half open (upper half) and half closed (lower half). This is the arrangement of slots 54 is shown in FIG. 5. It should be noted that the best results correspond to a ratio of cross-sectional area of the primary holes 52 to the cross-section of the secondary holes 54 of approximately 2:3.

Merely by way of example, a steamer 10 of the present invention can be built using a generally rectangular cooking cavity 30 with dimensions of 13½ inches wide by twenty-four inches deep by 15½ inches high resulting in a volume of approximately three cubic feet; a pool 62 with dimensions of 16¼ inches wide by twenty-two inches deep by ⅝ inches high and a 2° sloping floor and holding approximately ⅞ of a gallon of water; a first steam compartment 76 of general dimensions 16¼ inches wide by twenty-two inches deep by 2½ inches high; a second steam compartment 80 of general dimensions of 2½ inches wide by 16¼ inches deep by sixteen inches high; primary and secondary holes 52, 54 as described above, six electrical heating elements 20 of 1850 watts; and a thermal sensor 22 designed to trip at a temperature of 420°. Such a unit is appropriate for holding five common trays of food.

While not shown, the steamer 10 may optionally include a condensate tray (not shown) attached to the door 12 for catching condensate. Such a condensate tray may optionally include a drain hole disposed close to the door's pivot axis that feeds water therein into a drip tray attached to the main housing of the steamer 10. A drain line may connect this drip tray to the drain line 99 if desired. Further, the condensate tray may be made reversible by having suitably mounted drain holes toward each end, with the drain hole located farthest from the door's pivot being suitably plugged.

In some embodiments, the door-open sensor 14 may take the form of a conventional contact switch that is activated by an arm (not shown) that is pivotally mounted to the steamer's housing at a midpoint of the arm's length, above the cooking cavity. A pin attached to the arm may advantageously extend out the midpoint of the cooking cavity, so that the door pushes against the pin at the same point regardless of the mounting orientation of the door.

Further, in some embodiments, the exhaust chamber 92 of the exhaust control system 90 may include backup overflow prevention in the form of an overflow port 97 placed high in the front portion of exhaust chamber 92. This overflow port may be vented to atmosphere with the understanding that some steam may be vented to atmosphere via the overflow port 97. The overflow port 97 may advantageously be located at a height above the highest expected water level in normal operation, but below the lowest level of the opening for the door 12, so that water should not flow out the front of the unit 10 even if drain port 98 or drain line 99 somehow become clogged.

The right sidewall 48 may be made to be removable from the unit 10, if desired, such as by having the right sidewall hang on suitable mounting knobs. In addition, while the discussion above has been in terms of the secondary holes 54 being in the right sidewall 48, this is not required by all embodiments. In some embodiments, the secondary holes 54 may instead be in the rear sidewall 44, or the left sidewall 42, or some combination of the sidewalls 42,44,48. As such, references in the accompanying claims to the steam flowing into the cooking cavity 30 via a sidewall 48, and the like, should be construed to cover steam flowing into the cooking cavity 30 via the appropriate holes in one or more of the sidewalls 42,44,48, unless otherwise indicated. However, it is believed advantageous if the holes for routing steam to the cooking cavity are located only in the floor 50 and two or less sidewalls, preferably only one sidewall.

The discussion above has used water as an illustrative fluid in the pool 62 for generating steam. It should be understood that pure water is not required; for instance, suitable agents may be added to the water to help prevent scaling, as is known in the art. As such, the term "water" as used herein is meant to encompass any fluid that may be used generate a hot vapor (called "steam" herein) suitable for contact with food.

It should be understood that the discussion above has focused on those areas relevant to one of ordinary skill in the art to understand and practice the present invention, and some related features. However, the discussion above has omitted several details of the steamer not relevant to understanding the present invention, as these details are understood by one of ordinary skill in the art without explicit explanation thereof.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A natural convection steam cooking device, comprising:
    a cooking cavity having a floor defining a lower boundary thereof and a sidewall defining a side boundary thereof, said floor having a plurality of first holes therein, said sidewall having a plurality of second holes therein;
    a steam chamber disposed below said cooking cavity and along said sidewall, said steam chamber operatively connecting to said cooking cavity via said first and second holes for the passage of steam from said steam chamber into said cooking cavity, said steam chamber having a pool disposed below said floor;
    a heat source for heating water in said pool so as to generate steam in said steam chamber;
    wherein said steam enters said cooking cavity from said steam chamber via both said first holes and said second holes; and
    wherein said steam circulates within said device in an unforced manner by natural convection.

2. The device of claim 1 wherein said floor generally defines a boundary of said steam chamber.

3. The device of claim 1 wherein said steam chamber includes a first generally horizontal section disposed between said pool and said floor and a second generally vertical section disposed proximate said sidewall.

4. The device of claim 3 wherein said second section is bounded by said sidewall.

5. The device of claim 3 wherein said pool extends directly beneath said first and second compartments.

6. The device of claim 1 wherein said first holes and said second holes have a ratio of cross-sectional areas of approximately 2:3.

7. The device of claim 1 wherein said second holes are disposed in a lower ⅔ of said sidewall.

8. The device of claim 1 further comprising an exhaust connecting said cooking cavity to atmosphere, said exhaust comprising an exhaust duct and a cap moveably engaging said exhaust duct, wherein said cap is operative to limit pressures in said cooking chamber to not more than slightly above atmosphere.

9. The device of claim 1 wherein said steam circulates within said cooking device in an unforced manner by natural convection along two paths:
    a first path from said steam chamber out through said first holes to said cooking cavity and then back to said steam chamber; and
    a second path from said pool, generally vertically proximate said sidewall, then out through said second holes into said cooking cavity, and then back to said steam chamber.

10. The device of claim 1 wherein said heat source comprises one or more electrical heating elements.

11. The device of claim 1 wherein a bottom of said pool is disposed at an angle to horizontal, and further comprising a water inlet for said pool disposed on a lower side of said bottom.

12. The device of claim 1 further comprising an automatically resetting thermal sensor connected to control said heat source such that heat source is turned off in response to said thermal sensor sensing a temperature of at least a predetermined temperature, but is turned on in response to said thermal sensor sensing a temperature below said predetermined temperature.

13. The device of claim 1:
    wherein said steam chamber includes a first generally horizontal section disposed between said pool and said floor and a second generally vertical section disposed proximate said sidewall;
    wherein said floor generally defines a boundary of said first section of said steam chamber and said second section is bounded by said sidewall;
    wherein said pool extends directly beneath said first and second compartments;
    wherein said first holes and said second holes have a ratio of cross-sectional areas of approximately 2:3;

wherein said steam circulates within said cooking device in an unforced manner by natural convection along two paths:
a first path from said steam chamber out through said first holes to said cooking cavity and then back to said steam chamber; and
a second path from said pool, generally vertically proximate said sidewall, then out through said second holes into said cooking cavity, and then back to said steam chamber.

14. The device of claim 13:
wherein said heat source comprises one or more electrical heating elements;
wherein said second holes are disposed in a lower ⅔ of said sidewall;
wherein a bottom of said pool is disposed at an angle to horizontal, and further comprising a water inlet for said pool disposed on a lower side of said bottom; and
further comprising an automatically resetting thermal sensor connected to control said heat source such that heat source is turned off in response to said thermal sensor sensing a temperature of at least a predetermined temperature, but is turned on in response to said thermal sensor sensing a temperature below said predetermined temperature.

15. The device of claim 1 wherein said sidewall is removable without the use of tools.

16. The device of claim 1 wherein said cooking cavity has a shape of a parallelepiped.

17. The device of claim 16 wherein at least two walls defining said cooking cavity, not including a door, are immovably fixed to the device.

18. The device of claim 16 wherein at least two walls defining said cooking cavity, not including a door, are non-porous.

19. The device of claim 16 wherein said cooking cavity has a volume of about two cubic feet or more.

20. The device of claim 1 wherein said cooking cavity is adapted to support a plurality of trays for holding food to be cooked.

21. A method of providing steam to a cooking cavity of a commercial steam cooking device, said cooking cavity having a floor defining a lower boundary thereof and a sidewall defining a side boundary thereof, said method comprising:
generating steam by heating water in a pool disposed below said cooking cavity, said pool forming a portion of a steam chamber;
routing steam from said steam chamber to said cooking cavity via both a plurality of first holes in said floor and a plurality of second holes in said sidewall; and
circulating said steam within said device in an unforced manner by natural convection.

22. The method of claim 21 wherein said steam chamber includes a first generally horizontal section disposed between said pool and said floor and a second generally vertical section disposed proximate said sidewall, and wherein said routing steam to said cooking cavity comprises routing steam along said second section and out said second holes.

23. The method of claim 21 wherein said second section is bounded by said sidewall.

24. The method of claim 22 wherein said pool extends directly beneath said first and second compartments and wherein said generating steam comprises heating water in said pool and thereby supplying steam directly to said first and second sections of said steam chamber.

25. The method of claim 21 wherein said routing steam to said cooking cavity comprises routing approximately 1½ times as much steam to said cooking cavity via said second holes as compared to via said first holes.

26. The method of claim 21 wherein said second holes are disposed entirely in a lower ⅔ of said sidewall.

27. The method of claim 21 further comprising limiting pressures in said cooking chamber to not more than slightly above atmosphere by connecting said cooking cavity to atmosphere via exhaust duct and a cap that moveably engages said exhaust duct.

28. The method of claim 21 wherein said circulating said steam within said device in an unforced manner by natural convection comprises circulating said steam within said cooking device in an unforced manner by natural convection along two paths:
a first path from said steam chamber out through said first holes to said cooking cavity and then back to said steam chamber; and
a second path from said pool, generally vertically proximate said sidewall, then out through said second holes into said cooking cavity, and then back to said steam chamber.

29. The method of claim 21 further comprising:
a) in response to turning on said cooking device, initiating a water flow into said pool and substantially simultaneously activating a heat source to generate heat;
b) thereafter, controlling the on/off state of the heat source based on a thermal sensor in thermal communication with said pool while circulating steam within said device by unforced natural convection.

30. The method of claim 29 further comprising:
c) thereafter draining said pool in response to turning off said cooking device; and
d) thereafter repeating steps a and b.

31. The method of claim 29 further comprising feeding water to said pool at a uniform rate during step b.

32. The method of claim 29 wherein said controlling the heat source comprises turning said heat source off in response to said thermal sensor sensing a temperature of at least a predetermined temperature and thereafter automatically turning said heat source back on in response to said thermal sensor sensing a temperature below said predetermined temperature.

33. The method of claim 29 wherein said pool has a pool floor disposed at an angle relative to horizontal, and wherein said initiating a water flow into said pool comprises initiating a water flow into said pool via an inlet disposed proximate a lower side of said pool floor.

34. The method of claim 29 wherein said steam cooking device further comprises a steam trap assembly disposed adjacent said cooking cavity and having downwardly extending baffle; and further comprising, after step a, feeding water from said pool to said steam trap assembly.

35. The method of claim 21:
wherein said steam chamber includes a first generally horizontal section disposed between said pool and said floor and a second generally vertical section disposed proximate said sidewall, and wherein said routing steam to said cooking cavity comprises routing steam along said second section and out said second holes;
wherein said pool extends directly beneath said first and second compartments and wherein said generating steam comprises heating water in said pool and thereby supplying steam directly to said first and second sections of said steam chamber;

wherein said routing steam to said cooking cavity comprises routing approximately 1½ times as much steam to said cooking cavity via said second holes as compared to via said first holes;

wherein said circulating said steam within said device in an unforced manner by natural convection comprises circulating said steam within said cooking device in an unforced manner by natural convection along two paths:
- a first path from said steam chamber out through said first holes to said cooking cavity and then back to said steam chamber; and
- a second path from said pool, generally vertically proximate said sidewall, then out through said second holes into said cooking cavity, and then back to said steam chamber.

36. The method of claim 35 further comprising:
a) in response to turning on said cooking device, initiating a water flow into said pool and substantially simultaneously activating a heat source to generate heat;
b) thereafter, controlling the on/off state of the heat source based on a thermal sensor in thermal communication with said pool while circulating steam within said device by unforced natural convection;
c) thereafter draining said pool in response to turning off said cooking device; and
d) thereafter repeating steps a and b;
e) wherein said controlling the heat source comprises turning said heat source off in response to said thermal sensor sensing a temperature of at least a predetermined temperature and thereafter automatically turning said heat source back on in response to said thermal sensor sensing a temperature below said predetermined temperature.

37. The method of claim 35:
wherein said pool has a pool floor disposed at an angle relative to horizontal, and wherein said initiating a water flow into said pool comprises initiating a water flow into said pool via an inlet disposed proximate a lower side of said pool floor;
wherein said steam cooking device further comprises a steam trap assembly disposed adjacent said cooking cavity and having downwardly extending baffle; and
further comprising, after step a, feeding water from said pool to said steam trap assembly; and
wherein said second holes are disposed entirely in a lower ⅔ of said sidewall.

38. A method of designing steam flow in a natural convection steam cooking device having a cooking cavity, said cooking cavity having a floor defining a lower boundary thereof and a sidewall defining a side boundary thereof, said method comprising:
establishing a plurality of first holes in said floor and a plurality of second holes in said sidewall; said first and second holes operatively connecting said cooking cavity to a steam chamber located below said floor and proximate said sidewall;
running first and second tests with a first size and/or location of said second holes to generate first and second respective test results, said tests comprising:
routing steam from said steam chamber to said cooking cavity via both said first holes and said second holes and circulating said steam within said device in an unforced manner by natural convection;
monitoring heat transfer in said cooking cavity during said routing;
selecting the size and/or location of said second holes corresponding to said test whose test results indicate more uniform heat transfer.

39. The method of claim 38 wherein said tests further comprises placing a plurality of trays in said cooking cavity, and wherein said monitoring comprises monitoring the temperature of a mass placed in each of said trays during said routing.

40. The method of claim 39 wherein said selecting comprises selecting the size and/or location of said second holes corresponding to said test whose test results indicate a minimum time difference between a first of said masses reaching a temperature and the last of said masses reaching said temperature.

41. The method of claim 40 wherein said plurality of trays comprises at least five trays.

* * * * *